Dec. 13, 1927.
S. J. BENS
CHAIN SAW
Original Filed April 23, 1921
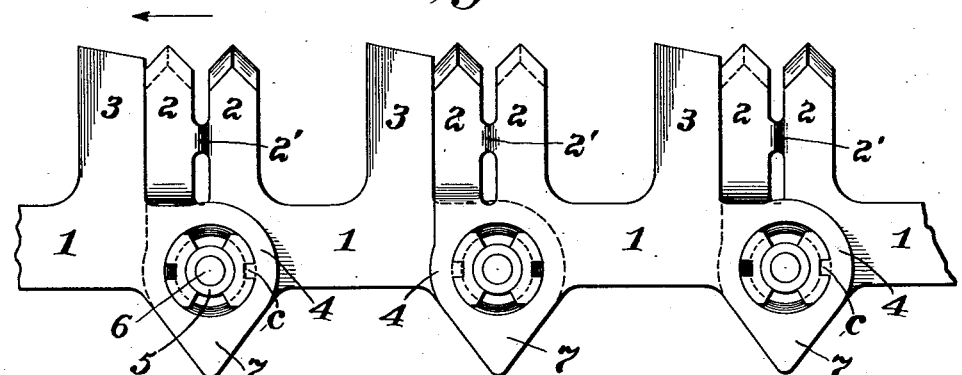
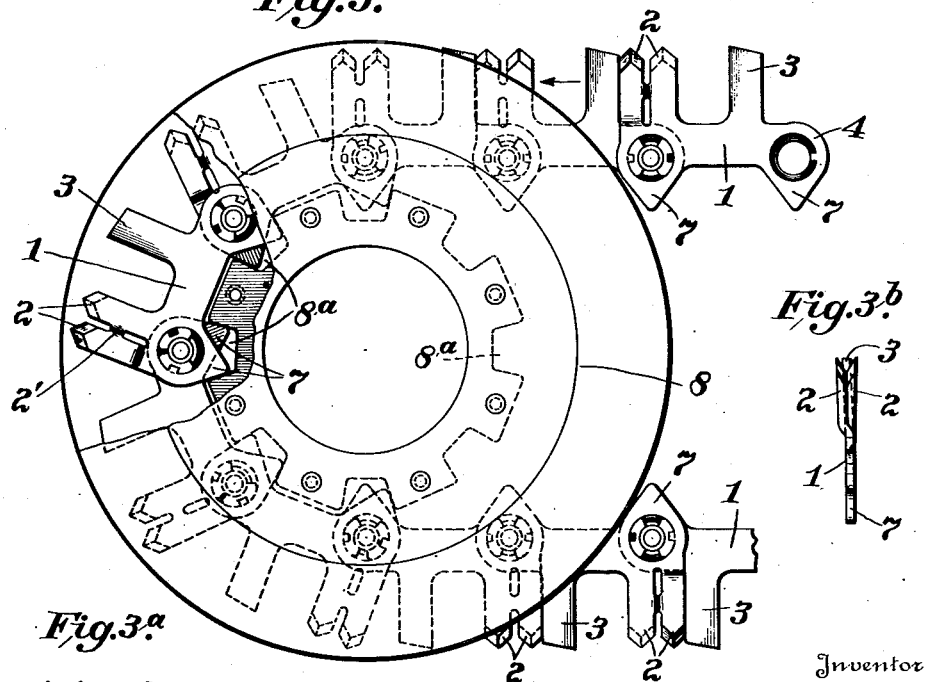
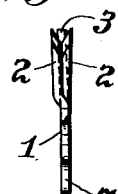
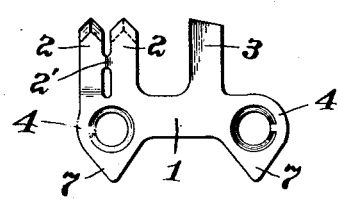
Inventor:
Samuel J. Bens,
Attorneys Patented Dec. 13, 1927.

1,652,295

UNITED STATES PATENT OFFICE.

SAMUEL J. BENS, OF NEW YORK, N. Y., ASSIGNOR TO CHAIN SAW CORPORATION, A CORPORATION OF DELAWARE.

CHAIN SAW.

Refile for abandoned application Serial No. 463,831, filed April 23, 1921. This application filed November 16, 1926. Serial No. 148,761.

My present invention relates to improvements in endless chain saws, and aims to provide a construction which may be of much reduced thickness as compared with previous saws of which I am aware, thus enabling the cutting to be performed with removal of a minimum amount of material and power.

I have also aimed to provide a saw which may be very economically produced, the links thereof being capable of being stamped from sheet metal, and readily assembled, the saw produced thereby being strong, durable and efficient.

A further object is to provide a chain which will not sag between the carrying sprockets, and another object is to provide an improved form of driving connection between the chain and sprockets.

With these and other objects in view, the invention includes the novel features of construction and arrangement and combination of parts hereinafter described and particularly defined by the appended claims.

In order that the invention may be better understood, reference is made to the accompanying drawings, in which—

Figure 1 is a side view of a number of connected links forming a portion of my improved saw.

Fig. 2 is an edge view of Fig. 1 as seen from above.

Fig. 3 is a view, partly in section, showing the engagement of the chain saw with a sprocket.

Fig. 3ª is a side elevation of one of the links detached and

Fig. 3ᵇ is an end view thereof.

Referring by reference characters to this drawing, I have shown in Fig. 1 two complete and two partial links of a chain saw, each of these designated by the numeral 1, carrying a pair of cutting teeth 2 and a clearer tooth 3.

Each of these links is formed from a single piece or blank which may be stamped from sheet metal with the teeth integral. Each link 1 has end portions or ears 4.

The ears of adjacent links overlap each other and are pivotally connected together, preferably by providing the ears with reversely flared aligning openings within which are placed a pair of arc-shaped bushings having V-shaped grooves in their edges to engage the reversely flared walls of the openings. The inner edges of the bushings are rebated on opposite sides and these rebates are engaged by correspondingly rebated complemental bushings 5 which hold the arc-shaped bushings apart with their V-shaped edges in engagement with the reversely flared walls of the recesses.

The bushings 5 are held together by a central rivet 6, and are held properly spaced and prevented from circumferential displacement by interlocking projections and recesses, as indicated at c. While I have described my preferred form of pivotal connection, it will be understood that I do not herein limit myself to this particular pivotal arrangement, this being made the subject of another application filed of even date herewith.

The cutting teeth 2 are preferably connected by an integral web or bracing member 2', and they are given the customary set, as indicated in Fig. 2, by deflecting them in opposite directions.

In order to make the chain self bracing to prevent sagging, I arrange the clearer teeth so that they will each abut against the edge of an adjacent cutting tooth when the links are in a straight line, as shown in Figs. 1 and 2.

This is accomplished by giving the clearer teeth and adjacent cutting teeth such a relative set as to bring their outer portions into substantial alignment.

By placing the cutter and clearer teeth at opposite ends of one and the same link, I am enabled to secure an abutting contact close to the extremities of the teeth, or at a point materially removed from the pivots. I thus hold the cutting portion of the chain to its work in a straight line without throwing undue strain on the pivots due to the amount of leverage secured, and am enabled to make the parts of lighter construction than would otherwise be possible.

To provide an efficient sprocket engaging means, I provide each pair of overlapping ears with depending substantially wedge shaped projections or teeth 7, which, when the links are in alignment, coincide in position. When, however, the links are deflected into angular position to conform to curvature of the sprocket, the projections or teeth move in opposite directions and assume the position shown in Fig. 3, thereby forming a broad tooth which fills or fits the recess 8ª of the sprocket 8.

By this arrangement it will be seen that I provide a chain which cannot "climb" the sprocket, for, as the chain links approach the sprocket, as indicated by the arrow, Fig. 3, the tooth formed by the two substantially coinciding projections 4 will be of substantially wedge shape and of less width than the sprocket recess, and hence be sure to enter the recess, and in fact will do so without contact with the walls of the recess or teeth, as such walls are in effect as shown at the top of Fig. 3.

As the links are deflected, however, in passing around the sprocket, the tooth forming projections will be opened out into engagement with the recess walls, as shown in the succeeding positions, Fig. 3.

By this arrangement I also provide a chain which will have a minimum amount of wear, as there is no sliding engagement of the chain teeth and sprocket recesses at the points where the teeth enter and leave the recesses.

Having thus described my invention, what I claim is:

1. An endless chain saw comprising a plurality of links of a single thickness having overlapping portions pivotally connected together, each of said links having a pair of cutting teeth at one end and a clearer tooth at the opposite end, the clearer tooth of one link abutting against a cutting tooth of an adjoining link when the corresponding portion of the saw is straight.

2. An endless chain saw comprising a plurality of links of a single thickness having overlapping portions pivotally connected together, each of said links having a pair of elongated cutting teeth at one end and a clearer tooth at the opposite end, the clearer tooth of one link abutting against a cutting tooth of an adjoining link close to the extremity of the teeth.

3. An endless chain saw comprising a plurality of links of a single thickness having overlapping portions pivotally connected together, each of said links having a pair of elongated cutting teeth near one end having an integral connection between their outer portions, and having an elongated clearer tooth near the opposite ends, the adjacent cutting and clearer teeth having elongated opposed faces extending to near the outer ends of the teeth and abutting against each other throughout substantially their entire length when the corresponding portion of the saw is straight.

In testimony whereof, I affix my signature.

SAMUEL J. BENS.